US011985120B2

(12) United States Patent
Colesanto et al.

(10) Patent No.: US 11,985,120 B2
(45) Date of Patent: May 14, 2024

(54) COMPUTER-IMPLEMENTED METHOD AND SYSTEM FOR SECURE IDENTIFICATION OF DISCONNECTED OBJECTS AND THEIR LOCATIONS

(71) Applicant: FOODEA LAB S.R.L., Benevento (IT)

(72) Inventors: Angelo Colesanto, Fombio (IT); Fabio Melen, Milan (IT)

(73) Assignee: FOODEA LAB S.R.L., Benevento (IT)

( * ) Notice: Subject to any disclaimer, the term of this patent is extended or adjusted under 35 U.S.C. 154(b) by 183 days.

(21) Appl. No.: 17/639,513

(22) PCT Filed: Sep. 4, 2020

(86) PCT No.: PCT/IB2020/058245
§ 371 (c)(1),
(2) Date: Mar. 1, 2022

(87) PCT Pub. No.: WO2021/044356
PCT Pub. Date: Mar. 11, 2021

(65) Prior Publication Data
US 2023/0179592 A1    Jun. 8, 2023

(30) Foreign Application Priority Data
Sep. 5, 2019   (IT) .......................... 102019000015701

(51) Int. Cl.
*H04L 9/40*    (2022.01)
(52) U.S. Cl.
CPC ................................ *H04L 63/0838* (2013.01)
(58) Field of Classification Search
CPC .................................................... H04L 63/0838
See application file for complete search history.

(56) References Cited

U.S. PATENT DOCUMENTS

2016/0036809 A1   2/2016   Bhimanaik
2017/0019413 A1   1/2017   Dailly

FOREIGN PATENT DOCUMENTS

WO    2018022993 A1    2/2018

OTHER PUBLICATIONS

Written Opinion in related PCT Application No. PCT/IB2020/058245 dated Nov. 6, 2020; 13 pages.
International Search Report in related PCT Application No. PCT/IB2020/058245 dated Nov. 6, 2020; 3 pages.

*Primary Examiner* — Normin Abedin
(74) *Attorney, Agent, or Firm* — Mark Malek; Widerman Malek, PL

(57) ABSTRACT

A computer-implemented method for secure identification of a device being associated at a specific location, thus allowing a user to activate a procedure connected to the specific location where the device is placed, said device being disconnected from internet, comprising the following steps: an enrollment process performed through an application miming on a mobile device, said enrollment process associating the device hardware parameters to the specific location and recording and storing these data on a back-end application miming on a central system; a generation process performed on the device, said generation process generating and displaying on the device a graphical code OTP based with limited lifetime; a validation process of the graphical code OTP based; if the received graphical code OTB based is validated, the user is allowed to activate, through his mobile device, the procedure connected to the specific location.

14 Claims, 9 Drawing Sheets

COMPUTER-IMPLEMENTED METHOD AND SYSTEM FOR SECURE IDENTIFICATION OF DISCONNECTED OBJECTS AND THEIR LOCATIONS

RELATED APPLICATIONS

This application is a national phase application of and claims priority under 35 U.S.C. § 371 of PCT Patent Application Serial No. PCT/162020/058245 filed on Sep. 4, 2020 and titled COMPUTER-IMPLEMENTED METHOD AND SYSTEM FOR SECURE IDENTIFICATION OF DISCONNECTED OBJECTS AND THEIR LOCATIONS. The content of this application is incorporated herein by reference.

FIELD OF THE INVENTION

The present invention concerns a computer-implemented method and system for secure identification of disconnected objects and their locations, based on a graphical (or multi-dimensional) code implemented in a OTP technology.

BACKGROUND OF THE INVENTION

One-Time based (OTP) technologies are well known for secure authentication of digital identities in order to have access to a server or in general to a private network. Techniques exist for providing access to private networks over the public network and for providing secure, encrypted transmission of messages and data between a user's computing device and the private network over the public network.

The private network may be configured to prevent unauthorized users from accessing the private network and to allow only authorized users to access the private network and/or information stored in the private network. Recognizing such authorized users typically relies on verifying the identity of the user, i.e., authenticating the user to the network.

Typically, a user may be asked to provide a username and an OTP (optionally combined with a password or a PIN) in order to authenticate to and access the private network.

In order to provide an alternative of user's authentication that is able to guarantee an increased security level with respect to the standard username-password based method, in US2016/036809 A1, a method for user authentication is proposed, based on a verification upon of a code transmitted from a trusted and registered device, of which the user is the owner, that is used to prove his identity.

Furthermore, multi-dimensional codes (like QRcode) are widely adopted for connections or activations of offline processes for mobile applications and are typically static values or permanent tags/label located in a specific place and connected to a functionality (see FIG. 2) for instance for activating a function. Because of the static nature of multi-dimensional code, the security of implementations based on these technologies can be put at risk when activating critical processes. A potential attacker can try to guess the codes and activate the system remotely or take a picture of the code and use it later, activating unforeseen procedures.

To ensure security the multi-dimensional codes should be changed with a certain frequency, leading to the same paradigm of static passwords.

In the attempt to overcome these limitations, WO2018/022993 A1 discloses a method for secure identification of a mobile device (or user device), wherein a graphical physical and static token is combined with nonce data relative to an imaging device coupled to the user device for the operation of capturing the image data. The nonce data can comprise: (i) operational parameters of the imaging device, (ii) positional information about the imaging device or the user device, and (iii) characteristics of the image data. The user is authenticated on the basis of the identification information of the physical token and the nonce data of the user device and, thanks to the combination of the physical token with nonce data, anti-reply attacks are avoided by comparing nonce data of two transactions and not authorizing the second transaction if the nonce data have been already employed in the first transaction.

In the last years, the rapid rise of network threats has further exposed the inadequacies of static passwords as the primary mean of authentication on the Internet.

One Time Password is certainly one of the simplest and most popular forms of two-factor authentication for securing network access. For example, in large enterprises, Virtual Private Network access often requires the use of One Time Password tokens for remote user authentication. One Time Passwords are often preferred because this technique does not require the installation of any client desktop software on the user machine, therefore allowing them to roam across multiple machines including home computers, devices and personal digital assistants.

Moreover, in the ordinary process OTPs are used for strong authentication in a process where the OTP is generated from a physical device or software as proof of possess of the second factor for authentication (something the user has) on top of static credentials (e.g. username and password or PIN, something the user knows).

As described in the flow chart in FIG. 1 trying to be authenticated in an application or in a system, in a first step, a user is requested with credentials, then after filling them, the OTP system generate an OTP string and display it to the user. Then the user sends credentials and the OTP to the application/system which checks them and if they are valid the user is authenticated at a next session to the private network, and if they are not valid the user is not authenticated.

Nowadays an OTP stand-alone device is ordinarily used as the second factor for strong authentication system and cannot be identified if placed in a specific location or cannot identify an associated identity or object placed in a specific location. The OTP validation algorithm requires to know in advance the user who the OTP is associated, otherwise the checking algorithm would need to verify the OTP against all the possible valid values, that became very inefficient (or impossible) when the number of users grows. In addition, being the OTP MAC/hash-based (so a shorter string is generated from the original values of the algorithm) cannot be excluded a collision of the generated values with a different valid OTP, turning into the impossible determination of the exact match. Thus, in the same way leading to the same problem of location identification of the device itself. Furthermore, OTP systems based on time-synchronization between the authentication server and the client providing the one-time-password (OTPs are valid only for a prefixed and generally known period of time), are more secure as the shorter is the time period for the validation as this reduce the time for a potential attacker to try to guess the OTP. As the opposite, the user experience and the battery consumption for the disconnected device are improved with a longer period of time, thus exposing the system to security vulnerability.

In fact Time based OTP systems are usually related to a hardware (or equivalent software implementation) called a security token able to generate a one-time password, i.e. a number that changes periodically. Inside the token is an accurate clock that has been synchronized with the clock on the proprietary authentication server. On these OTP systems, time is a part of the password algorithm, since the generation of new passwords is based on the current time rather than, or in addition to, the previous password or a secret key (also known as seed). This token may be a proprietary device, or a mobile phone or similar mobile device which runs software that is proprietary, freeware, or open-source.

An example of time-synchronized OTP standard is Time-based One-time Password Algorithm (TOTP).

Thus, there is a need to tackle the abovementioned security challenges and improve the authentication process.

SUMMARY OF THE INVENTION

One object of the present invention, according to a first of its aspects, is obtaining a computer-implemented method able to identify and to localize a disconnected device if placed in a specific location.

A second object of the present invention is to make this identification secure and not vulnerable to malicious attacks, increasing the global security.

A further object is to optimize the computer-implemented method in order to reduce the battery consumption of the device implementing the computer-implemented method during operation.

A further object of the present invention is to provide a device implementing the computer-implemented method being easily restorable if compromised.

An object of the present invention is also to keep the user experience simple and avoid using technologies not available on any mobile phone, for a wider and immediate adoption.

The system should be easily implemented on low cost mobile devices only requiring a camera and not requiring any specific proximity technologies like BLE (Blue Tooth Low Energy), or contactless technologies like (e.g. NFC) or similar technologies.

According to a first aspect this invention relates to a computer-implemented method for secure identification of a device being associated at a specific location, thus allowing a user to activate a procedure connected to the specific location where the device is placed, said device being disconnected from internet, comprising the following steps:

performing an enrollment process through an application running on a mobile device in order to associate the device hardware parameters to the specific location and to record and store these data on a back-end application running on a central system, generating and displaying on the device a graphical code OTP based with limited lifetime, acquiring by the user through the application running on the mobile device said graphical code, thus obtaining a proof of proximity of the user to the specific location where the device is placed, through the application and internet connection sending the acquired graphical code to a back-end application running on the central system, checking by the back-end application running on the central system if the received graphical code OTP based, once converted in a OTP string, is validated or not through a OTP validation algorithm.

if the received graphical code OTP based is validated thus confirming the proximity of the user to the specific location where the device is placed, validating the graphical code thus allowing the user to activate the procedure connected to the specific location.

Such a computer implemented method enables secure identification of a device and its location, said device being univocally associated at a specific location and being disconnected from internet, thus allowing a user to activate, through his mobile device a procedure connected to the specific location where the device is placed.

According to a second aspect this invention relates to computer-implemented method comprises the following process:

an enrollment process comprising the following steps performed on the device generating a random enrollment time of the disconnected device and a random seed, getting hardware ID parameters of the device, combining their value obtaining an enrollment string, encrypting said enrollment string, converting said encrypted enrollment string in a graphical code, displaying the enrollment graphical code and further comprising the following steps performed on the mobile device acquiring said enrollment graphical code through the mobile device, converting said enrollment graphical code in said encrypted enrollment string and sending it through internet connection to the back-end application on the central system, acquiring by the user device specific location data and further comprising the following steps performed by the back-end application on the central system receiving and decrypting said encrypted enrollment string, splitting the hardware ID, seed, enrollment time values, calculating a time difference value, said time difference value being local time of a central system minus enrollment time, associating and storing hardware ID, seed, enrolment time, time difference, device specific location data values;

a generation process running on the device comprising the steps of generating an OTP generation string on the basis of the seed and a device time, combining said OTP generation string with the hardware ID value of the device obtaining a combined generation string, encrypting said combined generation string obtaining an encrypted combined generation string, creating a generation graphical code corresponding to said encrypted combined generation string;

a validation process comprising the steps performed on the mobile device of acquiring said generation graphical code through the application on the mobile device, converting said generation graphical code in said encrypted combined generation string and sending it through internet connection to the back-end application on the central system and further comprising the following steps performed by the back-end application on the central system receiving and decrypting said encrypted combined generation string, splitting the hardware ID, the OTP generation string values, getting the time difference, the seed, the hardware ID values and the local time value of the central system, checking if the OTP string is validated using a OTP validation algorithm and using as input the received OTP generation string, the seed and a second time difference where said second time difference is central system local time minus time difference, thus if the OTP generation string is validated, allowing identifying the device and confirming its location at the local time of the central system corresponding to the generation time of the device, thus allowing the user to activate a procedure connected to the location where the device is placed at the generation time of the device corresponding to the local time of the central system.

It enables device battery life to get longer and to increase the global security of the system; in fact the time window where the device operate (enrollment-time), is defined as a random value during the enrollment process and shared with the back-end application.

According to a third aspect this invention relates to computer-implemented method comprising steps for generating an enrollment control code, thus enabling the central system to verify if an unexpected re-enrollment process occurs.

According to a fourth aspect this invention relates to computer-implemented method comprising steps for acquiring further user data and for authenticating him, in order to associate them to other parameters acquired during method operation.

According to a fifth aspect this invention relates to computer-implemented method where each graphical code is a QR code ore similar in order to make the system easily implemented on low cost mobile devices only requiring a camera.

According to a sixth and a seventh aspects this invention relates to a system and a device configured to perform the computer-implemented method disclosed thus enabling secure identification of a device associated at a specific location, therefore allowing a user to activate a procedure connected to the specific location where the device is placed.

According to an eighth aspect this invention relates to a device provided with a reset switch in order to perform a device reset, in case the device is compromised.

According to a last aspect this invention relates to a use of the computer-implemented method in a food ordering store, where the device is connected to a table or a seat the store thus the device being univocally associated and coupled to said table or seat where the user wishes to place an order, thus allowing the user, using his mobile device to scan the generation graphical code, which once being validated, make the user to access a ordering application identifying the table or seat where the food has to be delivered.

embodiments of the present invention are illustrated as an example and are not limited by the figures of the accompanying drawings, in which like references may indicate similar elements.

BRIEF DESCRIPTION OF THE DRAWINGS

The structural and functional features of the present invention and its advantages with respect to the known prior art, will become even clearer from the underlying claims, and in particular from an examination of the following description, made with reference to the attached figures which show a preferred but not limited schematic embodiment of the invented computer-implemented method, system, device, in which:

DETAILED DESCRIPTION OF THE INVENTION

In general, this disclosure describes a computer-implemented method, system for identifying and authenticating a device to a central system using a one-time password (OTP), in particular using a One Time based graphical code (preferably a QR code or similar), said computer-implemented method being able to either identify a device and to localize the device in a specific place.

A device is configured to generate a One Time based graphical code at least in part comprising device attributes. Device attributes may include, but are not limited to, hardware features ID, or system attributes, device settings (both software and hardware).

Generally, device attributes are typically device-specific and may not be duplicated on another device.

The system according to the present invention comprises a device physically connected to an object in a precise location or generally placed in a specific location, a central system configured to identify the device and its location and a mobile device.

With regard to the computer-implemented method according the present invention the device implementing part of the computer-implemented method, at the first boot, needs an enrollment process (enrollment process will be explained below), allowing the device been assigned to an object to which the device is physically connected or to a location where the device is actually placed respectively.

Figure 1:
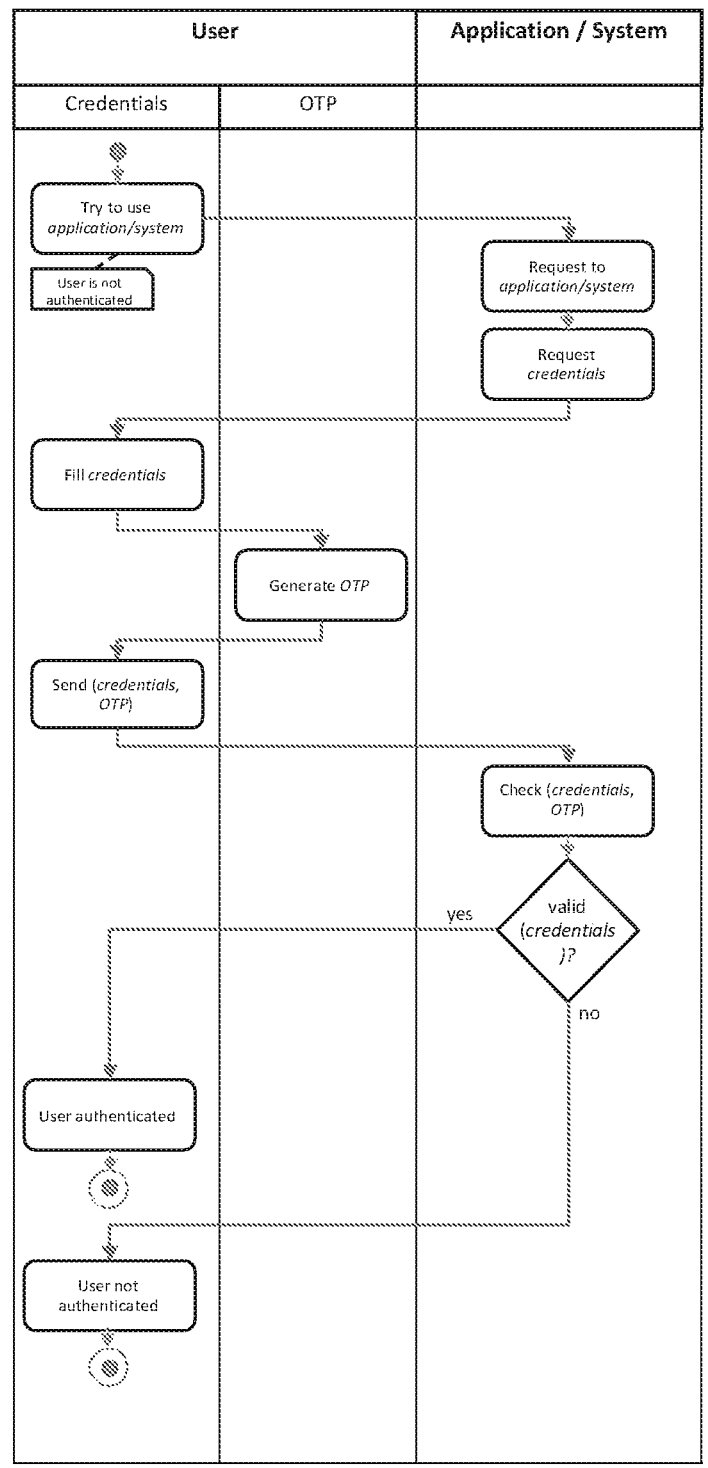
FIG. 1 illustrates a general framework for the authentication of a client on a server using an OTP state-of-the-art computer-implemented method.
Figure 2:
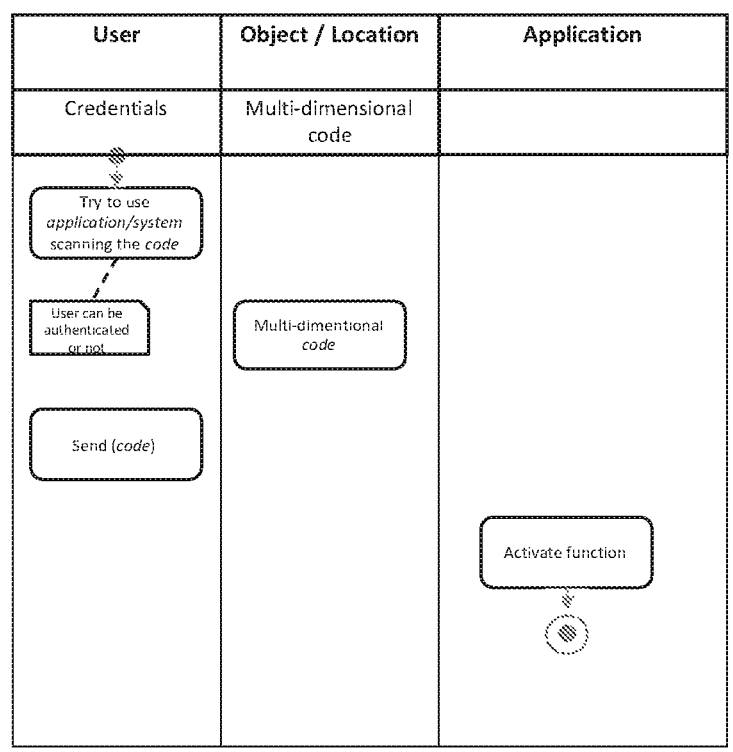
FIG. 2 illustrates a general framework for activating a function using a multi-dimensional (or graphical) state-of-the-art code.
Figure 3:
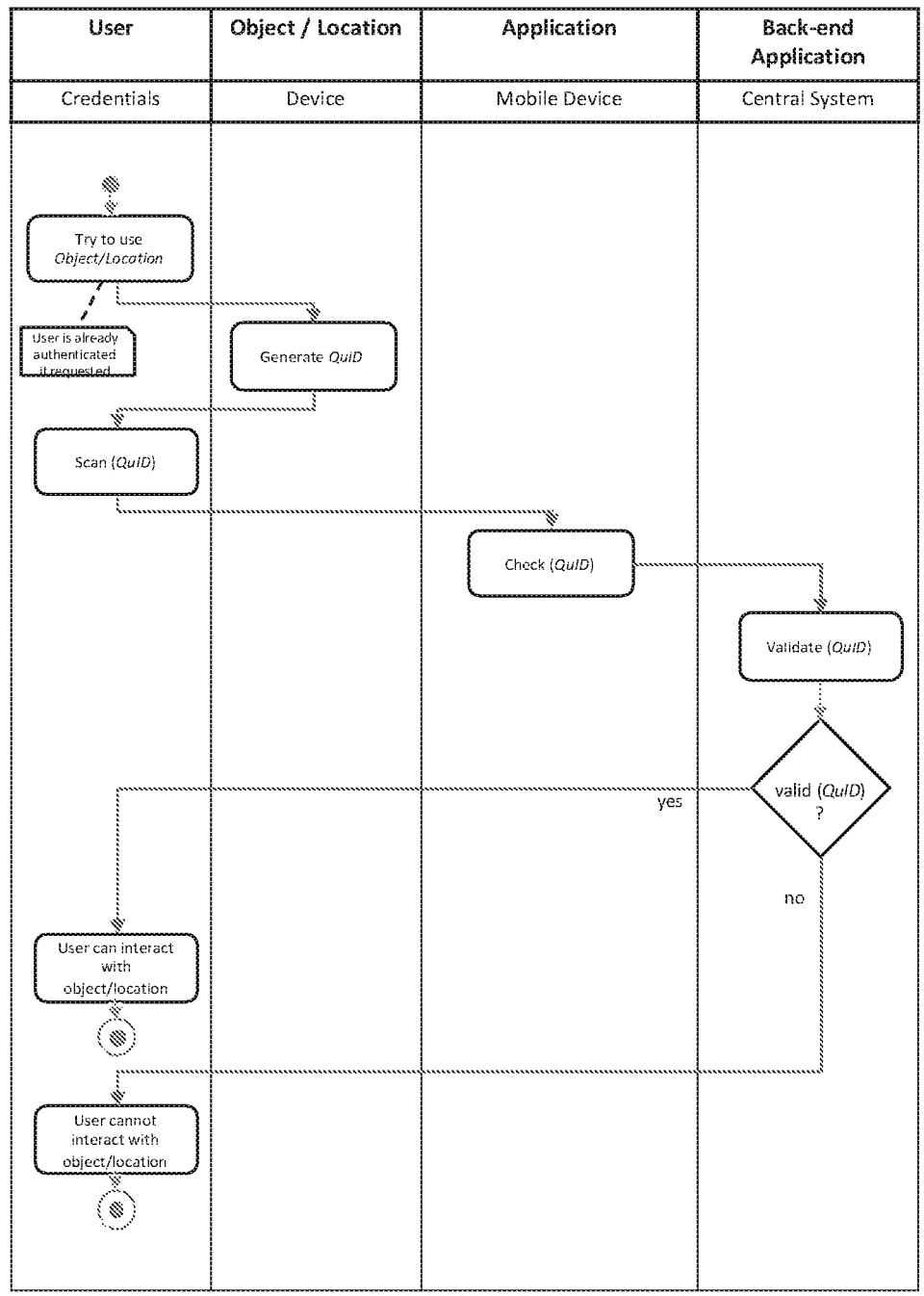
FIG. 3 illustrates a framework for the identification of a device and for the localization of the device in a specific place using the One Time based graphical code computer-implemented method of the present invention.

After the enrollment process has been performed, the computer-implemented method according the present invention, as shown in FIG. 3, may start with a user previously authenticated (if requested by the application (may be optional)). Then said user wants to activate a procedure connected to the object or to the location where the device is placed (being said object or location known to the central system of the present invention).

Subsequently the device generates a graphical code, for example a QRcode or similar, said graphical code with limited lifetime in order to provide a proof of proximity of the user to said device while an operation is desiderated to happening.

The user, once the graphical code has been generated by the device, acquires the graphical code for instance with a camera provided on his mobile device, as proof of proximity and sends it, through the application running on the mobile device, to a back-end application running on a central system, for checking the graphical code.

Subsequently if the graphical code is deemed valid then the user is able to interact with object/location where is physically located the device. Otherwise if the graphical code is deemed not valid then the user is not able to interact with object/location where is physically located the device.

The graphical code has a limited lifetime and is unique for the specific object or location to which the device is physically connected or where the device is actually placed respectively.

As mentioned before the device need to be coupled to physical object or location.

The association to an object or location is performed during the enrollment process, thus being implemented in the system of the present invention.

The device creates all the requested information and provides to the central system the information as graphical enrollment code, that is read by the application running on a mobile device and sent to the central system. Association relationship between the device and the object/location is maintained in the central system.

Figure 7:
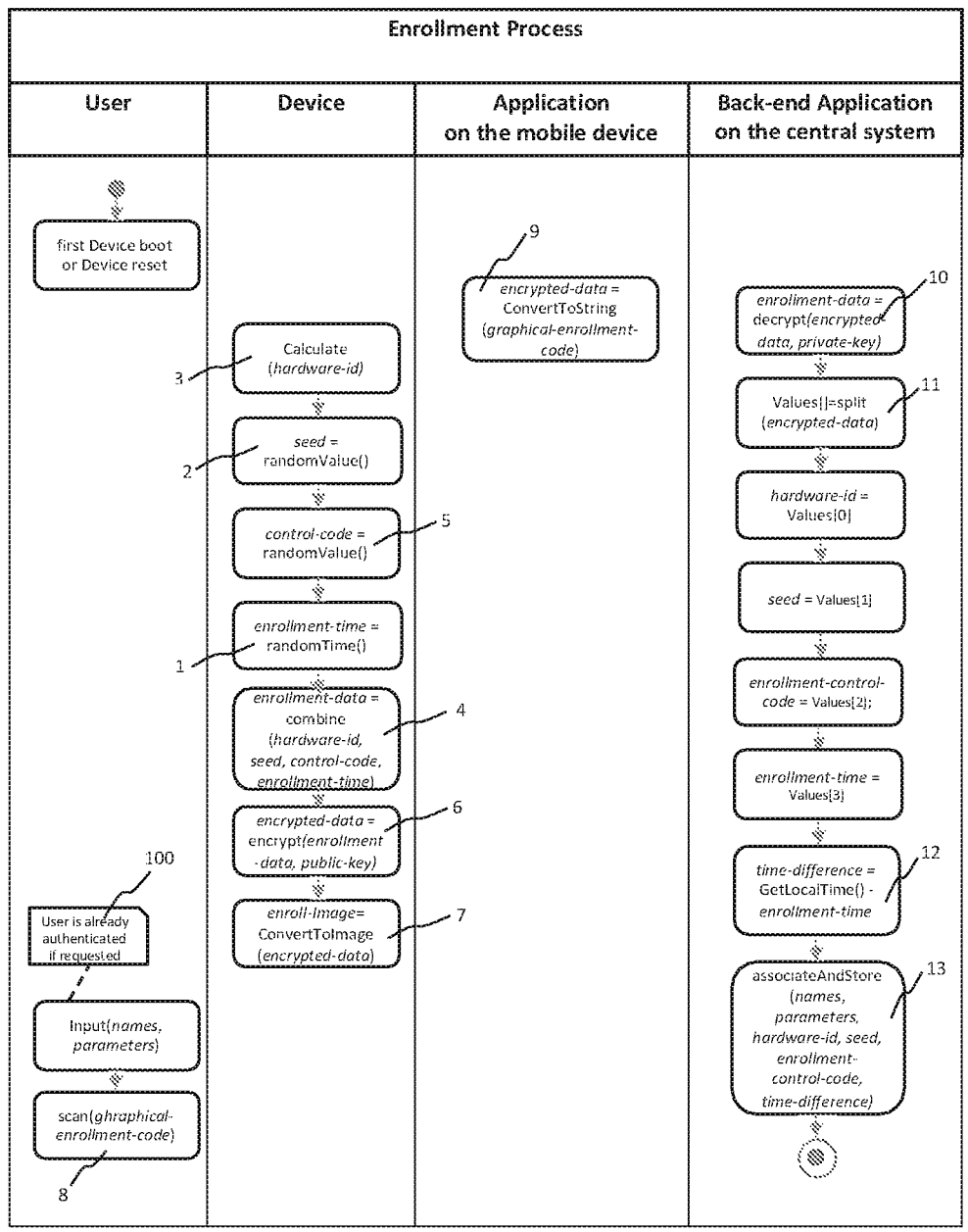
FIG. 7 illustrates a flow chart of the enrollment steps of the computer-implemented method according to the present invention.

The enrollment process, which does not require network connectivity to operate, allows the device being associate to the object/location in the system invented as showed in FIG. 7 and comprises the following steps:
  the device calculates:
    a unique hardware-id value, based on the device hardware components and immutable while the hardware is the same, even is the device is re-enrolled;
    a random seed for the OTP algorithm;
    a random enrollment-time value;
    a random control-code (may be optional);
  the device stores locally all the above calculated values;
  the device combines all the above calculated values, obtaining an enrollment string;
  the device encrypts the enrollment string with an asymmetric algorithm using the public-key shared with the device at building/configuration time;
  the device converts the encrypted enrollment string as graphical enrollment code;
  the device displays the graphical enrollment code;
  a user, using the mobile device, scans the graphical enrollment code;
  the application converts the graphical enrollment code into an encrypted enrollment string and sent it to a back-end application on the central system;
  the back-end application decrypts the encrypted enrollment string and extracts, splitting, the values calculated by the device;
  the received control-code value is used as enrolment-control-code (may be optional);
  the back-end application calculates the time-difference as difference from the local time of the central system and the enrollment-time of the device, shared during the enrollment process;
  the application requests to the user to define names and parameters to assign to the device and the device specific location data (may be optional);
  the back-end application associates and stores the defined names and parameters to the values calculated by the device (may be optional):
(names, parameters, device specific location data)á(hardware-id, seed, time-difference, enrolment-control-code (may be optional)).

All dates and times values in the current document are represented in epoch/unix format (number of seconds starting from Jan. 1, 1970) in GMT time zone. While the hardware-id can be potentially used as seed, it is discouraged to use it or any derivate as seed as HW derivate are easy to guess, being typically serial or with assigned range for the same HW producer. In addition, using the hardware-id requires the hardware replacement if the seed is compromised. For that reason, the usage of a random seed completely disconnected from HW assigned is strongly preferred, this allows also to create a new seed if compromised or used for different scope.

In case the device is compromised it has to be restored to a safe state through a reset switch. Every time the "reset" of the device is operated, the device creates a new enrollment process, with a new seed, generated as random value and shared during the enrollment process with the central system.

Figure 5:
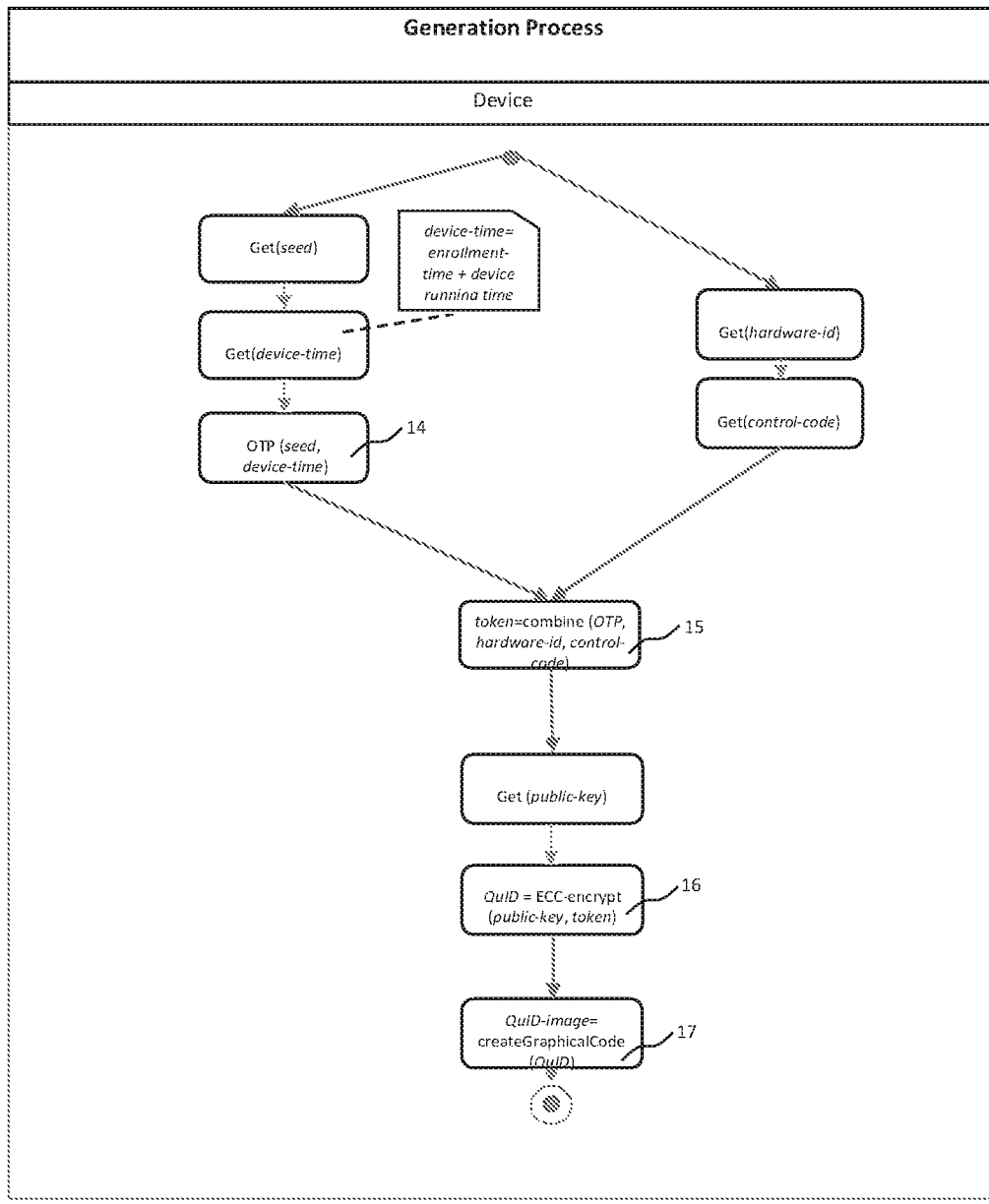
FIG. 5 illustrates a flow chart of the graphical code generation steps of the computer-implemented method according to the present invention.

With regard to the graphical code generation process performed on the device, it is illustrated in FIG. 5 and may be written in any programming language, following is reported as a reference implementation using pseudocode (not intended to be formally valid or working source code) as mentioned below, considering that QuID stands for Quick Identifier and correspond to what is indicated in this description as code:
  QuID-image=createGraphicalCode(ECC-encrypt(public-key, combine(OTP(seed,device-time), hardware-id, control-code)));

The graphical code/QuID generation process is performed on the device at regular intervals and comprises the following steps:
  the device gets the stored values of the seed, the hardware-id and the control-code (may be optional), defined during the enrollment process;
  the device gets the device-time value; at run time, the device-time value is actually the random enrollment-time, calculated during the enrolment process, plus the elapsed time from generation of the value (device-time=enrollment-time+device running time in seconds);
  the device uses an OTP algorithm to create an OTP generation string based on seed value and device-time value;
  the device combines the OTP generation string with the other static information generated during the enrollment process (hardware-id, control code (may be optional)) creating a combined generation string;
  the device gets the public-key, coupled with the private-key of the back-end application (running on central system) at building/configuration time, from the local stored information;
  the device encrypts the combined generation string with hardware-id and control-code (may be optional) with an asymmetric encryption algorithm to increase the protection level also for static values, generating an encrypted combined generation string;
  the encrypted combined generation string is displayed on a device display in the form of a graphical generation code, preferably a QR code (as QR codes are extremely widespread).

While internet connection is not needed for the device to be identified thus the device being disconnected from internet, if available (on an ongoing basis or discontinuously), the internet connection may be used to correct the time drift of the device, using the Network Time Protocol (NTP) or to pull updates and information in a secure way from the central system, using the graphical code/QuID implementation for authentication. The device comprises a battery; in order to make battery life longer, the OTP time windows implemented in the computer-implemented method may be also enlarged to reduce the number of OTP generated per hour and save more battery life, but this configuration may lead to a security problem for the global system. In fact, enlarging the time window of the OTP to reduce battery may introduce a potential risk to the security, while this give more time to a potential attacker to attempt to force the seed. To mitigate this risk on top of using a long string as seed, the time window where the device operate (enrollment-time), is defined as a random value during the enrollment process and shared with the back-end application. This way on top of the ordinary value to guess (the seed) a potential attacker needs to know also the enrollment-time of the device, increasing the global security.

Any OTP algorithm can be used in the process. For majority of use cases TOTP implementation is suggested and IETF-RFC6238 is a suitable option. Suggested encryption algorithm for efficiency and resource consumption is ECC (Elliptic-curve cryptography)/ECIES (Elliptic Curve Integrated Encryption Scheme). Any asymmetric encryption algorithm can be used, e.g. RSA. The representation as hexadecimal string of the encrypted value is also suitable for transport over HTTP.

Furthermore, depending on the scenario both pure One-Time validation or Limited-Time validation can be used. In case of One-Time validation, the central system, when the first valid OTP has been received for the current time windows set, will store the information that the currently valid OTP has been consumed and will refuse future validation of the same OTP. For Limited-Time validation, any OTP valid for the current time windows set will be validated.

Figure 8:
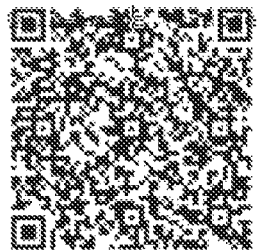
FIG. 8 illustrates a graphical code according to an embodiment of the present invention.

An example of how the generation processes works on the device is described below using pseudocode (not intended to be formally valid or working source code) as mentioned below, considering that QuID stands for Quick Identifier and correspond to what is indicated in this description as graphical code, as illustrated in FIG. 8.

Sample Graphical Code Generation Process, Running on the Device:

```
// pre-shared data at building/configuration
time: public-key = "ecdsa-sha2-nistp256
AAAAE2VjZHNhLXNoYTItbmlzdHAyNTYAAAAIbmlzdHAyNTYAAABBBL7981Yuxw0utZYh
zIBeTIBOW6r+DkFnUgIskA3t+rKzKJf+KM6OFpHr8xL81fxDdHMOuZ024vdWcQv56C+p
F7g= ecdsa-key-20190728";
// data shared during Enrollment process:
hardware-id="0A0B0C0D0E0F1A2B3C4D5E6F";
seed="RN08ab9b06gLKyA0AVdA";
// seed corresponding HEX value="
524e3038616239623036674c4b79413041566441";
enrollment-time="1976-09-10 12:24:59 AM GMT" // which
matches "211163099" seconds;
// run-time data
device-time = GetDateTime ( ); // (enrollment-time + device-
running- time), assuming "1976-09-15 12:10:05 AM GMT" which
matches "211594205" seconds
QuID-image = createGraphicalCode(ECC-encrypt(public-key,
combine(OTP(seed,device-time), hardware-id, control-
code)));
Output data
OTP ( ) ="669944";
combine ( ) = "6699440A0B0C0D0E0F1A2B3C4D5E6FqI7KAUVKdYyXWB4fJHtE";
ECC encrypt ( ) ="BHhkS6Z5thFOm6rDsmLeGmZlXSnHebTwieMPFd+mm+b7EmlE7
f2EGClODAP3OyhmnD0WMPj/TAdVJH1LGCES4s66X2hZtuXCY7V0D8COdyf0ixqg4kSwi
7rB/+IKroIreDVXAMTSiAJGEuKqQFkf7JKsATlNo/u3cgfPKxkdKFtZHe+T";
```

[QuID-image (QRcode image) illustrated in FIG. 8]

Figure 6:
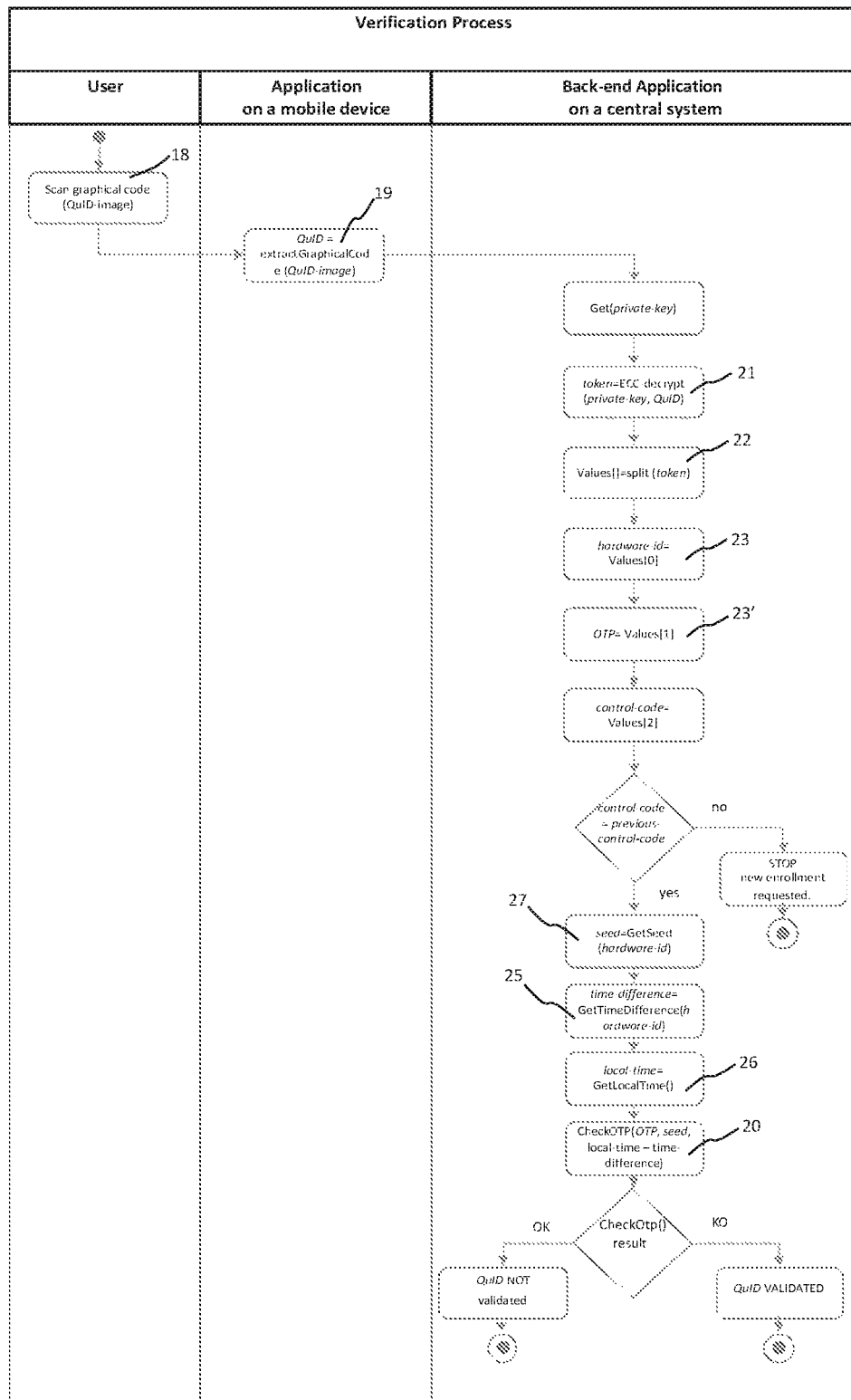
FIG. 6 illustrates a flow chart of the graphical code validation steps of the computer-implemented method according to the present invention.

With regard to the graphical code validation process performed on the back-end application it is illustrated in FIG. 6 and it may be written in any programming language, following is reported as a reference implementation using pseudocode (not intended to be formally valid or working source code) as mentioned below, considering that QuID stands for Quick Identifier and correspond to what is indicated in this description as graphical code:

```
Values[ ]=Split(ECC-decrypt(private-key,
extractGraphicalCode(QuID- image)));
hardware-id=Values[0];
OTP=Values[1];
control-code=Values[2];
If (control-code == enrollment-control-code(hardware-id)) then
{
  return checkOTP(OTP, control-code, local-time -
  time-difference(hardware-id), seed(hardware-
  id))
}
else
{
  error ("Error: STOP new enrollment
  requested"); return false
}
```

The graphical code/QuID validation process performed on the back-end application comprises the following steps:
- the user scans the graphical generation code with the application running on the mobile device;
- the application converts into the encrypted combined generation string the graphical code and send it to the back-end application;
- the back-end application gets the private-key (coupled with the corresponding public-key shared with the device at building/configuration time) from the local stored information;
- the back-end application decrypts the encrypted combined generation string of the encrypted graphical code using the private-key, with an asymmetric encryption algorithm;
- the back-end application splits the decrypted values obtaining the hardware-id, the OTP generation string and control-code values (may be optional);
- the back-end application verifies (may be optional) if the control-code is identical to the enrollment-control-code (shared during the enrollment process) and if they are different the process ends and it is required a new enrollment process of the device, otherwise if the two control code are identical the process continues;
- the back-end application gets form the local stored information the seed value, and the time-difference value associated to the hardware-id and gets the local time value of the central system (local-time);
- the back-end application verifies if (using the OTP validation algorithm, depending on the selected implementation) the OTP is validated using as input the received OTP generation string value, the seed (of the hardware-id) value and a second time difference value defined by the local-time of the central system minus the stored time-difference.

In order to identify if the device has been re-enrolled, the computer-implemented method implements the generation of a random control-code during the enrollment process. If the control code stored in the central system (enrolment-control-code) is different from the last received control-code, this identify that the device was unexpected re-enrolled (may be optional).

Figure 9:
FIG. 9 illustrates another graphical code according to an embodiment of the present invention.

An example of how the validation processes works on the back-end application is described below using pseudocode (not intended to be formally valid or working source code) as mentioned below, considering that QuID stands for Quick Identifier and correspond to what is indicated in this description as graphical code, as illustrated in FIG. 9.

Sample Graphical Code Validation Process of the Back-End Application Running on the Central System:

```
// pre-shared data:
private-key="-----BEGIN PRIVATE KEY-----
MIGHAgEAMBMGByqGSM49AgEGCCqGSM49AwEHBG0wawIBAQQg3oZccSorUNFlW+s6
s2eH92WuzrN3TEs0tbHiV+f1bBOhRANCAAS+/fNWLscNLrWWIcyAXkyATluq/g58
Z1ICLJAN7fqysyiX/ijOjhaR6/MS/JX8Q3RzDrmdNuL3VnEL+egvqRe4
-----END PRIVATE KEY-----; //PEM(PKCS#8)
// data shared during Enrollment process:
hardware-id="0A0B0C0D0E0F1A2B3C4D5E6F"
seed="RN08ab9b06gLKyA0AVdA"
// seed HEX value="524e30386162396230366674c4b79413041566441"
enrollment-time="1976-09-10 12:24:59 AM
GMT"; control-code="qI7KAuVKdYyXWB4fJHtE";
//data derived during enrollment process
time-difference(0A0B0C0D0E0F1A2B3C4D5E6F) = "1337724551"; //
GetDateTime( ) - enrollment-time in seconds, assuming "2019-01-31
10:34:10 AM GMT" - "1976-09-10 12:24:59 AM GMT" = 1548930850
seconds - 211206299 seconds = 1337724551 seconds
seed(0A0B0C0D0E0F1A2B3C4D5E6F) =
"RN08ab9b06gLKyA0AVdA";
enrollment-control-code(0A0B0C0D0E0F1A2B3C4D5E6F)
="qI7KAuVKdYyXWB4fJHtE";
```

Input Data

[graphical code (QuID-image) illustrated in FIG. 9]

```
//run-time data
Values [ ] =Split(ECC-decrypt(private-key,
extractGraphicalCode(QuID- image) ) ) ;
hardware-id=Values[0];
OTP=Values[1];
control-code=Values[2];
local-time = GetDateTime( ) ; // assuming "February 4, 2019
10:19:16 PM GMT"
```

-continued

```
If (control-code == enrollment-control-code(hardware-
id) ) then
{
  return checkOTP(OTP, control-code, local-time -
  time-difference(hardware-id), seed(hardware-
  id) ) )
,
```

Output Data

```
extractGraphicalCode( ) =
"BHhkS6Z5thFOm6rDsmLeGmZlXSnHebTwieMPFd+mm+b7Em1uwMlE7f2EGClODAP3Oyh
mnD0WMPj/TAdVJH1LGCES4s66X2hZtuXCY7V0D8COdyf0ixqg4kSwi7rB/+IKroIreDV
XAMTSiAJGEuKqQFkf7JKsATlNo/u3cgfPKxkdKFtZHe+T";
ECC-decrypt( ) =
"6699440A0B0C0D0E0F1A2B3C4D5E6FqI7KAuVKdYyXWB4f JHtE";
hardware-id="0A0B0C0D0E0F1A2B3C4D5E6F";
control-code="qI7KAuVKdYyXWB4fJHtE";
OTP="669944";
checkOTP( )=true;
```

All the possible activities and functions performed by the back-end application running on the central system may also be made or implemented in the application running on the mobile device.

Figure 4:
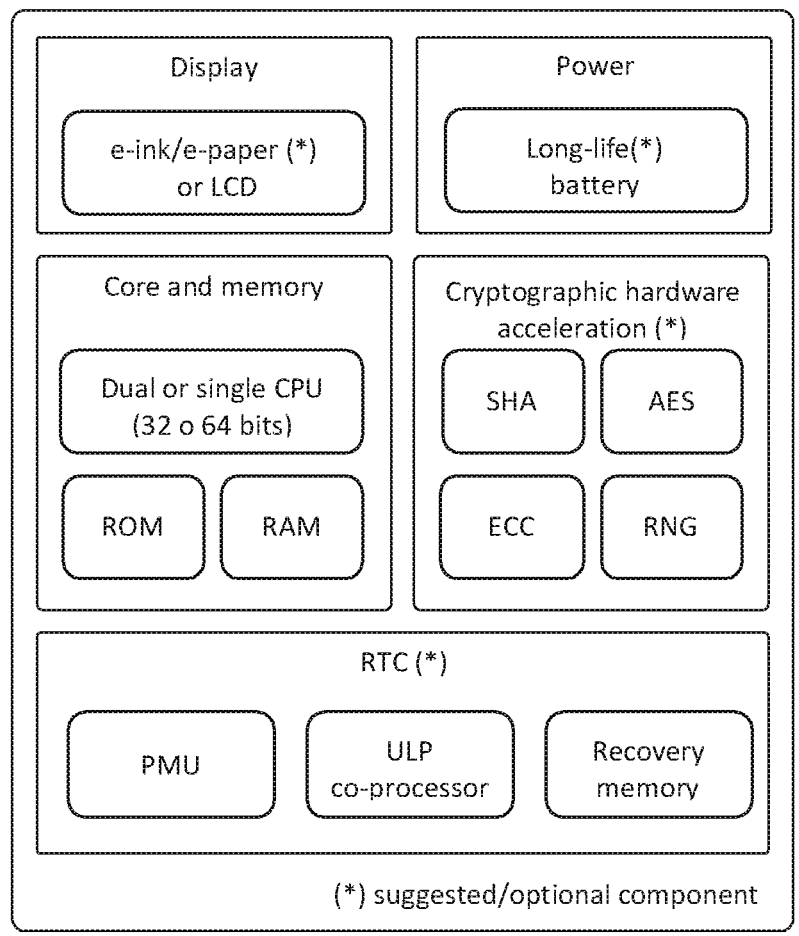
FIG. 4 illustrates a hardware scheme of the device used in the invented computer-implemented method.

As mentioned before FIG. 4 shows a hardware scheme of the device used in the invented computer-implemented method.

The device comprises a core (preferably 32 or 64 bit CPU) and a memory (RAM and ROM, preferably 520 KiB RAM), a battery, preferably a long life battery in order to make battery life longer and a display able to visualize the graphic code. In addition, the computer-implemented method can be implemented in a device provided with a LCD display, preferably with an e-paper (e-ink) display, which after showing the graphical code, may be shut down and the device put asleep, to save battery, waiting to calculate the graphical code at the end of the interval.

Furthermore, the device should comprise a cryptographic hardware acceleration system, to optimize the performance, in turn comprising a SHA function (Secure Hash Algorithm), a AES function (Advance Encryption Standard), an ECC function (Elliptic-curve cryptography), a RNG function (Random Number Generator).

Optionally the device may comprise a RTC controller (provided with deep-sleep mode) being able to selectively identify the hardware components to shut down, a PMU unit (Power Management Unit), a ULP (Ultra Low Power) coprocessor, a recovery memory.

Potential usage scenarios for the computer-implemented method, system and device according the present invention include, but is not limited to the following:

Food ordering (at a table, desk, seat, etc.): The device can be connected to a table or a seat and identify a specific table or seat in a restaurant or any kind of food store where the user wishes to place an order. The user scans the graphical code and access the ordering application identifying the table or seat where the food has to be delivered.

Queue/waiting list: The device can be connected to a totem in a location to apply for a queue or waiting list. The user scans the graphical code and the queue management application gives to the user information like: reservation number, priority, waiting time, etc.

Rent a vehicle (car, bike, scooter, etc.) or a good in general: The device can be connected to a vehicle (or to a good in general) to check-in/check-out the vehicle (or the good in general) for rent. The user scans the graphical code and the vehicle management application starts/stops the rental process.

Unlock a door or gate (house, hotel, garage, parking, etc.): The device can be connected to a door or gate to open/close and/or check-in/check-out the rent of the lodging, house, parking, etc. The user scans the graphical code and the door/gate management application open/close the door or gate and/or starts/stops the renting process (check-in/check-out).

The invention claimed is:

1. A computer-implemented method for secure identification of a device being associated at a specific location and capable of allowing a user to activate a procedure connected to the specific location, said device being disconnected from internet and having device hardware parameters, the device being defined as a disconnected device, the method comprising the following steps:

performing an enrollment process through an application running on a mobile device, said enrollment process generating data associating the device hardware parameters to the specific location and recording and storing the data on a back-end application running on a central system;

performing a generation process on the disconnected device, said generation process generating and displaying on the disconnected device a graphical code (one time password) OTP with limited lifetime;

performing a validation process of the graphical code OTP comprising the following steps:
  acquiring, by the user through the application running on the mobile device, said graphical code OTP to obtain a proximity of the user to the specific location where the disconnected device is placed;
  converting said graphical code OTP to an encrypted combined generation string, defined as an OTP string, and sending the OTP string through an internet connection to the back-end application on the central system;
  checking by the back-end application running on the central system if the received graphical code OTP, once converted to the OTP string, is validated or not through an OTP validation algorithm (20); and
  wherein if the received graphical code OTB is validated, confirming the proximity of the user to the specific location where the disconnected device is placed, validating the graphical code to allow the user to activate, through the mobile device, the procedure connected to the specific location;

wherein the enrollment process comprises the following steps performed on the disconnected device:
  generating a random enrollment time of the disconnected device and a random seed;

getting a unique hardware ID, based on hardware components of the disconnected device that are immutable while the hardware is the same;
combining the value of the hardware ID, the seed, and the enrollment time to obtain an enrollment string;
encrypting said enrollment string;
converting said encrypted enrollment string in a graphical code; and
displaying the enrollment graphical code;
wherein the enrollment process further comprises the following steps to be performed on the mobile device:
acquiring said enrollment graphical code through the mobile device,
converting said enrollment graphical code in said encrypted enrollment string;
sending encrypted enrollment string through the internet connection to the back-end application on the central system; and
acquiring, by the user device, specific location data;
wherein the enrollment process further comprises the following steps performed by the back-end application on the central system:
receiving and decrypting said encrypted enrollment string,
splitting the hardware ID, seed, enrollment time values,
calculating a time difference value, said time difference value being local time of a central system minus enrollment time, and
associating and storing hardware ID, seed, enrollment time and time difference;
wherein the generation process comprises the steps of:
generating an OTP generation string on the basis of the seed and a device time, said device time being the random enrollment-time plus the device running time;
combining said OTP generation string with the hardware ID of the device to obtain a combined generation string;
encrypting said combined generation string to obtain an encrypted combined generation string;
creating a graphical code OTP corresponding to said encrypted combined generation string;
wherein the step of checking the validation process comprises the following steps performed by the back-end application on the central system:
receiving and decrypting said encrypted combined generation string, splitting the hardware ID and the OTP generation string values,
getting the time difference, the seed, the hardware ID values and the local time value of the central system,
checking if the OTP string is validated using an OTP validation algorithm and using as input the received OTP generation string, the seed and a second time difference,
wherein said second time difference is central system local time minus the time difference,
wherein if the OTP generation string is validated, the device is identified and its location is confirmed at the local time of the central system corresponding to the generation time of the device, and
wherein upon validation of the OTP generation string, the user is permitted to activate a procedure connected to the location where the disconnected device is placed at the generation time of the disconnected device corresponding to the local time of the central system.

2. The computer-implemented method according to claim 1 further comprises the following steps:
wherein the enrolment process further comprises:
generating a random control code performed on the disconnected device,
combining a value of the control code with the hardware ID, seed, and enrolment time values to obtain the enrollment string performed on the disconnected device,
wherein once the enrolment string is decrypted by the back-end application, splitting, on the central system, the control code to be used as enrollment control code, and associating and storing the enrollment control code with additional-parameters relating to the hardware ID, seed, time difference;
wherein the validation process further comprises:
decrypting, on the central system, said generation string that also includes the control code;
verifying, using the back-end application, if the control-code is identical to the enrollment-control-code shared during the enrollment process;
wherein if the control-code and the enrollment-control-code are not identical, the process ends and a new enrollment process of the device is required; and
wherein if the control-code and the enrollment-control-code are identical, the process continues and the disconnected device can be enrolled.

3. The computer implemented method according to claim 1 wherein the enrolment process further comprises the steps of:
inputting names and parameters of the user using the application running on the mobile device,
inputting the names and parameters of the user for associating and storing to the other parameters hardware-id, seed, enrolment control code, time difference using the back end application on the central system.

4. The computer implemented method according to claim 1 wherein the user is previously authenticated on the application on the mobile device.

5. The computer implemented method according to claim 1 wherein the graphical code is a QR code.

6. The computer implemented method according to claim 1 wherein validating the graphical code OTP allows the user to access, through his mobile device, an ordering application identifying the specific place where food is to be delivered, the device being connected to a specific place in a food ordering store and the device being associated and the device being coupled to said specific place where the user wishes to place an order.

7. The computer implemented method according to claim 1 wherein validating the graphical code OTP allows the user to start or to terminate, through the mobile device, a rental process, the device being connected to a good to rent in a specific place in a rental store and the device being associated and coupled to said good in a specific place where the user has to leave the rented good.

8. The computer implemented method according to claim 1 wherein validating the graphical code OTP allows the user to receive, through his mobile device, at least one of the following: a reservation number, an indication of priority, and waiting time; and wherein the device is connected to a specific place where a user is added to at least one of a queue and a waiting list; and wherein the device is associated and coupled to said specific place.

9. The computer implemented method according to claim 1 wherein validating the graphical code OTP allows the user to at least one of open and close, through the mobile device, a door or a gate; wherein the device is connected to a specific to a door or gate which a user can at least one of open and close; and wherein the device is associated and coupled to said door or gate.

10. A computer-implemented method for secure identification of a device being associated at a specific location and capable of allowing a user to activate a procedure connected to the specific location where the device is placed, said device being disconnected from internet and having device hardware parameters, the device being defined as a disconnected device, the method comprising the following steps:
performing an enrollment process through an application running on a mobile device, said enrollment process generating data associating the device hardware parameters to the specific location and recording and storing the data on the application running on the mobile device;
performing a generation process on the disconnected device, said generation process generating and displaying on the disconnected device a graphical code one time password (OTP) with limited lifetime;
performing a validation process of the graphical code OTP comprising the following steps:
acquiring, by the user through the application running on the mobile device, said graphical code OTP to obtain a proximity of the user to the specific location where the device is placed;
converting, through the mobile device, said graphical code OTP to an encrypted combined generation string defined as an OTP string;
checking, using the application running on the mobile device, if the received graphical code OTP, once converted to the OTP string, is validated or not through an OTP validation algorithm; and
wherein if the received graphical code OTB is validated to confirm the proximity of the user to the specific location where the disconnected device is placed, validating the graphical code to allow the user to activate, through the mobile device, the procedure connected to the specific location;
wherein the enrollment process comprises the following steps performed on the disconnected device:
generating a random enrollment time of the disconnected device and a random seed;
getting a unique hardware ID, based on device hardware components of the disconnected device that are immutable while the hardware is the same;
combining the value of the hardware ID, the seed, and the enrollment time to obtain an enrollment string;
encrypting said enrollment string; and
converting said encrypted enrollment string in a graphical code, and
displaying the enrollment graphical code;
wherein the enrollment process comprises the following steps performed on the mobile device:
acquiring said enrollment graphical code,
converting said enrollment graphical code in said encrypted enrollment string;
acquiring, by the user, specific location data associated with the disconnected device;
decrypting said encrypted enrollment string, splitting the hardware ID, seed, enrollment time values,
calculating a time difference value, said time difference value being local time of the mobile device minus enrollment time,
associating and storing hardware ID, seed, enrollment time and time difference;
wherein the generation process comprises the steps of:
generating an OTP generation string on the basis of the seed and a device time, said device time being the random enrollment-time plus the device running time;
combining said OTP generation string with the hardware ID of the disconnected device to obtain a combined generation string;
encrypting said combined generation string to obtain an encrypted combined generation string;
creating a graphical code OTP corresponding to said encrypted combined generation string;
wherein the step of checking of the validation process comprises the following steps performed by the back-end application on the central system:
receiving and decrypting said encrypted combined generation string, splitting application on the mobile device, the hardware ID and the OTP generation string values,
getting the time difference, the seed, the hardware ID values and the local time value of the mobile device,
checking if the OTP string is validated using an OTP validation algorithm and using as input the received OTP generation string, the seed and a second time difference where said second time difference is mobile device local time minus the time difference,
wherein if the OTP generation string is validated, the disconnected device is identified and its location is confirmed at the local time of the mobile device corresponding to the generation time of the device, and
wherein upon validation of the OTP generation string, the user is allowed to activate a procedure connected to the location where the disconnected device is placed at the generation time of the disconnected device corresponding to the local time of the mobile device.

11. The computer-implemented method according to claim 10 wherein the enrollment process further comprises the following steps:
generating a random control code performed on the disconnected device,
combining the control code value with the hardware ID, seed, and enrolment time values to obtain the enrollment string performed on the disconnected device,
wherein once the enrolment string is decrypted by the application running on the mobile device, splitting, using the mobile device, the control code to be used as an enrollment control code, and associating and storing the enrollment control code with other parameters relating to hardware ID, seed, and time difference;
wherein the validation process further comprises:
decrypting, using the mobile device, said generation string that includes the control code;
verifying, using the application running on the mobile device, if the control-code is identical to the enrollment-control-code shared during the enrollment process;

wherein if the control code and the enrollment code are different, the process ends a new enrollment process is required to enroll the disconnected device; and wherein if the control code and the enrollment control code are identical, the process continues, and the disconnected device can be enrolled.

12. The computer implemented method according to claim 10 wherein the enrolment process further comprises the steps of:

inputting names and parameters of the user using the application running on the mobile device to be associated and stored with other parameters relating to hardware-id, seed, enrolment, control code, time difference.

13. A system for secure identification of a device being associated at a specific location, thus allowing a user to activate a procedure connected to the location where the device is placed, said device being disconnected from internet and defined as a disconnected device, the system comprising a mobile device, a central system, wherein the disconnected device includes an interface, a processor coupled to said interface, and a memory coupled to the processor, wherein the memory has stored thereon computer executable instructions which, when executed, configure the processor to perform a method comprising the steps of:

performing an enrollment process through an application running on the mobile device, said enrollment process generating data associating the device hardware parameters to the specific location and recording and storing the data on a back-end application running on a central system;

performing a generation process on the disconnected device, said generation process generating and displaying on the disconnected device a graphical code (one time password) OTP with limited lifetime;

performing a validation process of the graphical code OTP comprising the following steps:

acquiring, by the user through the application running on the mobile device, said graphical code OTP to obtain a proximity of the user to the specific location where the disconnected device is placed;

converting said graphical code OTP to an encrypted combined generation string, defined as an OTP string, and sending the OTP string through an internet connection to the back-end application on the central system;

checking by the back-end application running on the central system if the received graphical code OTP, once converted to the OTP string, is validated or not through an OTP validation algorithm (20); and wherein if the received graphical code OTB is validated, confirming the proximity of the user to the specific location where the disconnected device is placed, validating the graphical code to allow the user to activate, through the mobile device, the procedure connected to the specific location;

wherein the enrollment process comprises the following steps performed on the disconnected device:

generating a random enrollment time of the disconnected device and a random seed;

getting a unique hardware ID, based on hardware components of the disconnected device that are immutable while the hardware is the same;

combining the value of the hardware ID, the seed, and the enrollment time to obtain an enrollment string;

encrypting said enrollment string;

converting said encrypted enrollment string in a graphical code; and displaying the enrollment graphical code;

wherein the enrollment process further comprises the following steps to be performed on the mobile device:

acquiring said enrollment graphical code through the mobile device, converting said enrollment graphical code in said encrypted enrollment string;

sending encrypted enrollment string through the internet connection to the back-end application on the central system; and acquiring, by the user device, specific location data;

wherein the enrollment process further comprises the following steps performed by the back-end application on the central system:

receiving and decrypting said encrypted enrollment string, splitting the hardware ID, seed, enrollment time values, calculating a time difference value, said time difference value being local time of a central system minus enrollment time, and associating and storing hardware ID, seed, enrollment time and time difference;

wherein the generation process comprises the steps of:

generating an OTP generation string on the basis of the seed and a device time, said device time being the random enrollment-time plus the device running time;

combining said OTP generation string with the hardware ID of the device to obtain a combined generation string;

encrypting said combined generation string to obtain an encrypted combined generation string;

creating a graphical code OTP corresponding to said encrypted combined generation string;

wherein the step of checking the validation process comprises the following steps performed by the back-end application on the central system:

receiving and decrypting said encrypted combined generation string, splitting the hardware ID and the OTP generation string values, getting the time difference, the seed, the hardware ID values and the local time value of the central system, checking if the OTP string is validated using an OTP validation algorithm and using as input the received OTP generation string, the seed and a second time difference, wherein said second time difference is central system local time minus the time difference, wherein if the OTP generation string is validated, the device is identified and its location is confirmed at the local time of the central system corresponding to the generation time of the device, and wherein upon validation of the OTP generation string, the user is permitted to activate a procedure connected to the location where the disconnected device is placed at the generation time of the disconnected device corresponding to the local time of the central system.

14. A device that is disconnected from the internet and defined as a disconnected device, the device being associated to a specific location and configured to allow a user to activate a procedure associated to the specific location where the disconnected device is placed, said disconnected device comprising a display, a processor coupled to said display, a memory coupled to the processor, the memory having stored thereon computer executable instructions which, when executed, configure the processor to perform a method comprising the steps of:

performing an enrollment process through an application running on a mobile device, said enrollment process generating data associating the device hardware parameters to the specific location and recording and storing the data on a back-end application running on a central system;

performing a generation process on the disconnected device, said generation process generating and displaying on the disconnected device a graphical code (one time password) OTP with limited lifetime;

performing a validation process of the graphical code OTP comprising the following steps:

acquiring, by the user through the application running on the mobile device, said graphical code OTP to obtain a proximity of the user to the specific location where the disconnected device is placed;

converting said graphical code OTP to an encrypted combined generation string, defined as an OTP string, and sending the OTP string through an internet connection to the back-end application on the central system;

checking by the back-end application running on the central system if the received graphical code OTP, once converted to the OTP string, is validated or not through an OTP validation algorithm (20); and wherein if the received graphical code OTB is validated, confirming the proximity of the user to the specific location where the disconnected device is placed, validating the graphical code to allow the user to activate, through the mobile device, the procedure connected to the specific location;

wherein the enrollment process comprises the following steps performed on the disconnected device:

generating a random enrollment time of the disconnected device and a random seed;

getting a unique hardware ID, based on hardware components of the disconnected device that are immutable while the hardware is the same;

combining the value of the hardware ID, the seed, and the enrollment time to obtain an enrollment string;

encrypting said enrollment string;

converting said encrypted enrollment string in a graphical code; and displaying the enrollment graphical code;

wherein the enrollment process further comprises the following steps to be performed on the mobile device:

acquiring said enrollment graphical code through the mobile device, converting said enrollment graphical code in said encrypted enrollment string;

sending encrypted enrollment string through the internet connection to the back-end application on the central system; and acquiring, by the user device, specific location data;

wherein the enrollment process further comprises the following steps performed by the back-end application on the central system:

receiving and decrypting said encrypted enrollment string, splitting the hardware ID, seed, enrollment time values, calculating a time difference value, said time difference value being local time of a central system minus enrollment time, and associating and storing hardware ID, seed, enrollment time and time difference;

wherein the generation process comprises the steps of:

generating an OTP generation string on the basis of the seed and a device time, said device time being the random enrollment-time plus the device running time;

combining said OTP generation string with the hardware ID of the device to obtain a combined generation string;

encrypting said combined generation string to obtain an encrypted combined generation string;

creating a graphical code OTP corresponding to said encrypted combined generation string;

wherein the step of checking the validation process comprises the following steps performed by the back-end application on the central system:

receiving and decrypting said encrypted combined generation string, splitting the hardware ID and the OTP generation string values, getting the time difference, the seed, the hardware ID values and the local time value of the central system, checking if the OTP string is validated using an OTP validation algorithm and using as input the received OTP generation string, the seed and a second time difference, wherein said second time difference is central system local time minus the time difference, wherein if the OTP generation string is validated, the device is identified and its location is confirmed at the local time of the central system corresponding to the generation time of the device, and wherein upon validation of the OTP generation string, the user is permitted to activate a procedure connected to the location where the disconnected device is placed at the generation time of the disconnected device corresponding to the local time of the central system.

* * * * *